United States Patent [19]
Williams

[11] 3,772,718
[45] Nov. 20, 1973

[54] CABLE INDICATING, FLOTATION AND VIBRATION DAMPING DEVICES

[75] Inventor: Harrison L. Williams, Euclid, Ohio

[73] Assignee: Preformed Line Products Company, Cleveland, Ohio

[22] Filed: Aug. 16, 1971

[21] Appl. No.: 172,181

[52] U.S. Cl. .................................. 9/8 R, 43/44.94
[51] Int. Cl. ............................................. B63b 21/52
[58] Field of Search .......................... 9/8 R; 57/145; 43/44.94, 44.92, 44.9

[56] References Cited
UNITED STATES PATENTS

| | | | |
|---|---|---|---|
| 898,784 | 9/1908 | Von Rosenberg | 43/44.95 |
| 1,986,441 | 1/1935 | Koepke | 43/44.91 |
| 3,241,262 | 3/1966 | Beverly | 43/44.91 |
| 3,618,308 | 11/1971 | Little | 57/145 |
| 3,132,417 | 5/1964 | Irwin | 9/8 R |
| 3,332,093 | 7/1967 | Skinner et al. | 9/8 R |
| 2,501,634 | 3/1950 | Rector | 43/44.91 X |
| 3,406,513 | 10/1968 | Butz et al. | 57/145 |

FOREIGN PATENTS OR APPLICATIONS

| | | | |
|---|---|---|---|
| 793,379 | 1/1936 | France | 43/44.94 |
| 361,078 | 11/1931 | Great Britain | 43/44.94 |
| 314,206 | 6/1929 | Great Britain | 43/44.94 |

*Primary Examiner*—Milton Buchler
*Assistant Examiner*—Gregory W. O'Connor
*Attorney*—James P. Hume et al.

[57] ABSTRACT

Appliances for linear bodies having application, for example, as aircraft warning, flotation and vibration damping devices are disclosed. Relatively large, light-weight members are secured to a cable or the like by helically preformed appliances. The appliances either have one end portion embedded in the light-weight member or are interconnected with attachment apparatus for the member. Several embodiments are disclosed.

11 Claims, 5 Drawing Figures

PATENTED NOV 20 1973     3,772,718
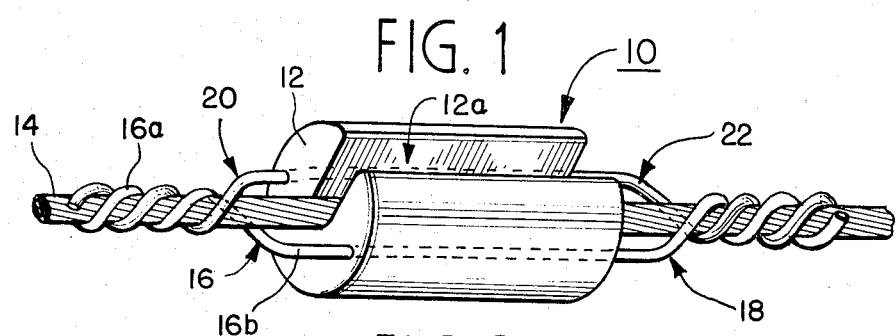
FIG. 1
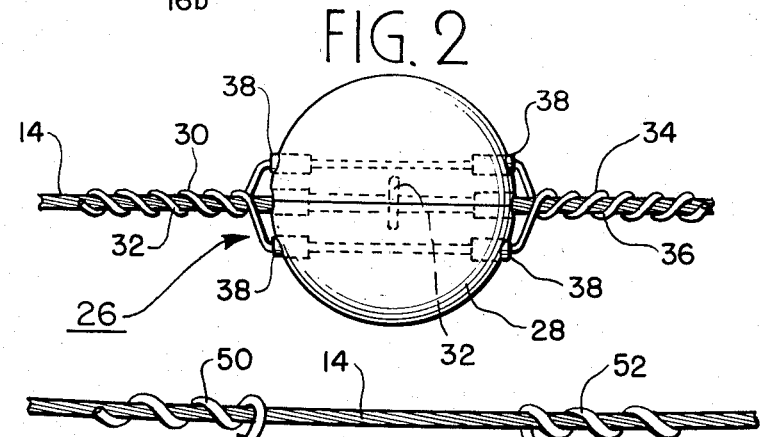
FIG. 2
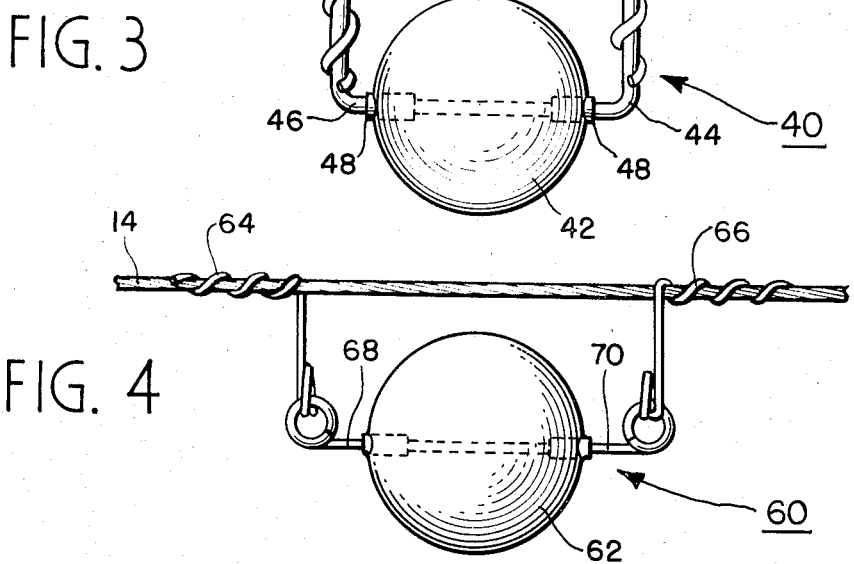
FIG. 3
FIG. 4
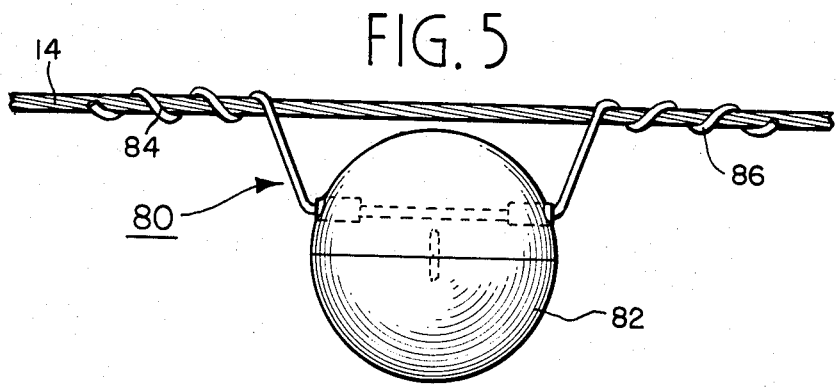
FIG. 5

CABLE INDICATING, FLOTATION AND VIBRATION DAMPING DEVICES

INTRODUCTION

The present invention relates generally to appliances for linear bodies and, more particularly, is directed to new and improved appliances having application as aircraft warning, flotation and vibration damping devices.

SUMMARY OF THE INVENTION

There is provided in accordance with the present invention a variety of new and improved appliances having applications as varied as aircraft warning, flotation and vibration damping devices. The appliances of the invention are characterized by their simplicity, economy, ease of installation and reliability.

In accordance with one facet of the invention, a flotation device for attachment to a linear body comprises float means including a body portion having a density less than that of water and a connector portion. Helically preformed rod means are provided for joining the float and the linear body. To this end, the helically preformed rod means include a first portion of a first predetermined internal diameter and pitch length for attachment to the linear body in encircling relation thereto and a second portion coupled to the connector portion of the float means.

Another facet of the invention is directed to an appliance for a linear body of a type including a supported means comprising a relatively large, light-weight member of a predetermined geometric configuration. Attachment means are securely engaged opposite sides of the light-weight member and extend outwardly therefrom to provide respective attachment elements. A pair of helically preformed appliances each having first helical leg portions for encircling the linear body and second helical leg portions for engaging the attachment elements are provided to securely connect the light-weight member to the linear body. This appliance has application variously as a float, an aircraft warning implement and a vibration damper.

Other features and aspects of the invention are also disclosed and claimed herein.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several FIGS. of which like reference numerals identify like elements and in which:

FIG. 1 is a side elevational view of a flotation appliance constructed in accordance with the present invention;

FIG. 2 illustrates a second embodiment of the invention that is useful variously as a float, an aircraft warning implement or vibration damper;

FIG. 3 discloses a further embodiment of the invention;

FIG. 4 illustrates a structure generally similar to that of FIG. 3 wherein an alternate structure is illustrated for joining the supported body and the helical rods;

FIG. 5 depicts yet a further embodiment of the invention.

DESCRIPTION OF THE PREFERRED EMBODIMENTS

Referring now to FIG. 1, the flotation appliance 10 there shown comprises a float means 12 having a density or specific gravity less than that of water. In the present embodiment, the float means 12 is composed of a synthetic rubber polymer such as polyurethane. However, it will be recognized that various other materials may be used and that the configuration of the float means 12 may take a variety of forms, such as spherical.

The float means 12 herein is of a generally cylindrical contour having a longitudinally extending radial slot 12a for receiving a linear body or cable 14. The slot 12a serves to locate the float 12 on the cable 14. In the illustration, the float 12 and the cable 14 are coaxially aligned although such is not essential.

The float 12 is secured to the cable 14 by helically preformed rod means. Specifically, one such helical rod means 16 includes a first portion 16a of a predetermined internal diameter and pitch length for attachment to the cable 14 in encircling relation therewith. A second portion 16b of the preformed rod means 16 is coupled to a connector portion of the float means 12. In the present embodiment, the portion 16b is physically embedded in the polyurethane float 12. The portion 16b is spaced laterally to one side of the central axis of the float 12 and preferably is coaxially aligned and integral with a corresponding portion of a helical appliance 18 that extends into the opposite end of the float 12. The helical appliance 18 likewise includes a leg portion wrapped in encircling relation about the cable 14. The integral forming of the connector portions of the appliances 16, 18 enhances the strength of the float assembly 10 and facilitates fabrication of the unit. In this regard, the linear connecting portion of the integral appliances 16, 18 is intimately embedded in the polyurethane float 12 during the fabrication thereof. The methods for embedding rods or the like in such materials are well known in the art and therefore will not be considered herein.

A second pair of integral helical appliances 20 and 22, of a construction similar to the integral appliances 16 and 18, likewise extend from opposite sides of the float 12. The linear connecting portions of the appliances 20, 22 are integrally joined and are symmetrically disposed on the opposite side of the cable 14 from that of the corresponding linear connector portions of the appliances 16, 18. The helical portions of the appliances 20 and 22 are off-set in phase relative to their associated appliances 16 and 18, respectively, so as to permit wrapping of the several appliances about the cable 14 in a non-interfering relationship, as shown in the drawing.

The several helical elements 16, 18, 20, and 22 may each be of conventional construction and in the illustrated embodiments are formed as single elements of a rigid polyvinyl chloride composition. However, it will be understood that the helically preformed appliances may be similar in construction to those disclosed in the U.S. Pat. Nos. 2,609,653 and 2,761,273 and may be manufactured by any suitable method such as that disclosed in the U.S. Pat. No. 2,691,865, all of which patents are assigned to the same assignee as the present invention. Where the appliances are composed of a multiplicity of elements, the interwound strands or elements may be made of any suitable material that has sufficient strength, resiliency and flexibility to meet the requirements of the environment. Aluminum, steel, or similar metals in addition to the disclosed plastic composition are suitable. The individual elements of the band may be secured, if desired, in their bridging relationship by means of an adhesive, solder, brazing compound or the like. It will be recognized that the helical appliances described in connection with the other embodiments disclosed herein likewise may be of any of the construction heretofore noted.

The internal diameter of the helically preformed leg portions of each of the appliances 16, 18, 20 and 22 is nominally smaller than that of the cable 14 so as to insure a gripping engagement of the cable by the appliances. However, it will be recognized that the internal diameter of the appliances may be equal or somewhat larger than that of the cable 14 so as to permit a freedom of rotation of the float 12 about the cable 14. Again, it will be understood tha such a variation is contemplated in connection with each of the remaining embodiments of the invention to be described herein.

Referring now to FIG. 2, there is illustrated a second embodiment 26 of the invention that is useful variously as a float, an aircraft warning indicator or a vibration damper. A supported means 28 is formed as a relatively large, light-weight member of a predetermined geometric configuration, here a sphere. The member 28 may be made from any suitable material such as plastic or metal. It can be manufactured as two mating hemispheres, in multiple sections or as a single unit. If the member 28 is composed of mating sections, such as the pair of mating spheres shown in FIG. 2, the sections may be joined together at the time of installation by a suitable adhesive. The use of multiple sections permits compact shipment of the device to the installation site.

It will be understood that the member 28 or the similar structures illustrated in connection with the remaining embodiments herein may be of a solid or hollow construction. The described members may also be in the form of a hollow shell composed of a molded polyurethane foam.

The device 26 comprises respective pairs of interwound helically preformed appliances 30, 32 and 34, 36 extending from respective opposite sides of the sphere 28 and having respective helical leg portions wrapped in encircling relation about the cable 14. The helical appliances 30, 32, 34 and 36 may be substantially identical to the corresponding appliances described in connection with FIG. 1. Again, similar to the construction of FIG. 1, the respective pairs of appliances 30, 34 and 32, 36 are integrally joined together by co-linear connecting portions extending through the sphere 28. Respective identical bushings 38 composed of a rigid polyvinylchloride serve to journal the connector portions of each of the appliances in the hollow shell 28.

If the device 26 of FIG. 2 is utilized for flotation, it is convenient to manufacture the sphere 28 as a hollow shell of an aluminum, plastic or the like and to fill the interior of the shell with a material such as polyurethane foam. On the other hand, where the device 28 is used as an aircraft warning marker or the like, it may be composed of the hollow shell of polyurethane foam as illustrated.

A further embodiment 40 of the invention where the supported means is suspended below the cable 14 in the manner of a pendulum is illustrated in FIG. 3. A sphere 42 or other light-weight member of suitable geometric configuration includes respective L-shaped attachment members 44, 46 extending from respective opposite sides of the sphere 42. The attachment members 44, 46 are journaled in respective, identical bushings 48 disposed on diametrically opposite sides of the sphere 42. The connector members 44, 46 may extend through the sphere 42 along a common axis and be integrally joined to form a single U-shaped unit, as indicated by the dotted lines in the drawing. Alternatively, the connectors 44, 46 may terminate in the respective bushings 48.

The sphere 42 is supported in spaced relation to the cable 14 by a pair of identical, helically preformed appliances 50 and 52. Each of the appliances 50 and 52 includes a first helically preformed leg portion wrapped about the cable 14 and extending in respective opposite directions from one another. Second helically preformed leg portions of the appliances 50, 52 are bent downwardly at right angles to the axis of the first leg portions and are wrapped in tightly gripping relation about respective ones of the attachment members 44, 46.

Assuming that the leg portions 50, 52 tightly grip the cable 14, the only movement of the device 40 is rotation of the sphere 42 about the axis of the connecting portion of the L-shaped members 44, 46. In the present embodiment, the diameter of the L-shaped attachment members 44 and 46 may be of a constant value for all cable installations. Accordingly, the vertical leg portions of the appliances 50 and 52 may likewise be of a uniform internal diameter for tightly gripping the attachment members 44 and 46. The horizontal leg portions of the helical members 50 and 52 are, of course, under such circumstances manufactured of a variable diameter corresponding to that of the cable 14.

Referring now to FIG. 4, there is shown a second pendulum type device 60 which may be similar in construction to the embodiment of FIG. 4 excepting for the mode of attachment of a spherical member 62 to the cable 14. A pair of helical appliances 64 and 66 each include first helically preformed leg portions wrapped in encircling relation about the cable 14 and extending in respective opposite directions to one another. Of course, the helical legs 64, 66 may extend in the same direction although such is not preferred. At any rate, second leg portions of the appliances 64, 66 include linear segments extending vertically downward from the axis of the cable 14 and terminating in helical loops of a closed pitch but of an internal diameter significantly greater than that of the helices wrapped about cable 14.

A pair of attachment members 68 and 70 positioned on diametrically opposite sides of sphere 62 include respective linear portions extending through the sphere along a common diameter. The linear portions of the members 68 and 70 are preferrably integrally connected with one another to form a unitary attachment structure. The portions of the attachment members extending externally of the sphere 62 are formed as helical loops of a closed pitch and are interconnected with the loops of the appliances 64, 66 in the manner illustrated. The structure of FIG. 4 permits considerable latitude of movement of the sphere 62 since the sphere can swing in the loops or rings which link the helical rods 64, 66 to the attachment members 68, 70 of the sphere.

A third variant of the pendulum type device is represented by the device 80 of FIG. 5. Here again a sphere 82 or other suitable member is supported from a cable 14. A pair of helically preformed appliances 84 and 86 each include first leg portions extending in opposite directions from one another and wrapped in encircling relation about the cable 14. Second leg portions of the helical members 84, 86 protect downwardly at an angle of approximately 70° to the horizontal axis of the cable 14. These second leg portions terminate in horizontal segments that are received in respective identical bushings 88 positioned on opposite sides of the sphere 82. The horizontal segments of each member 84, 86 extend entirely through the spheres. It will be noted that in the present embodiment the axis of attachment of sphere 82 is positioned in the upper hemisphere of the sphere and does not extend through the geometric center of the sphere as in the other embodiments.

While particular embodiments of the present invention have been shown and described, it is apparent that various changes and modifications may be made, and it is therefore intended in the following claims to cover all such modifications and changes as may fall within the true spirit and scope of this invention.

What is claimed is:

1. A flotation device for attachment to a linear body, comprising:
   float means having a predetermined longitudinal center axis and comprising a body portion for application about said linear body with said linear body being disposed generally coincident with said longitudinal axis of said float means and said body portion having a density less than that of water and further comprising a connector portion; and
   helically preformed rod means comprising first and second pairs of helical appliances positioned on opposite sides of said float means, the individual appliances of each pair having respective attachment portions coupled to said connector portion on opposed sides of the longitudinal axis of said linear body and having helical leg portions offset in phase relative to one another for application about said linear body in non-interfering relation to secure said float means to said linear body and with the central axes of said helical leg portions being co-axial with said longitudinal axis of said linear body.

2. The flotation device of claim 1 in which said helical leg portions of said first and second pair of helical appliances are of a nominal internal diameter smaller than that of said linear body for securely gripping said linear body and for securing said flotation device to said linear body.

3. The flotation device of claim 2 in which said float means is applied about said linear body.

4. The flotation device of claim 3 in which the attachment portions of said first and second pairs of appliances are linear rods and in which said rod attachment portions of said first pair of appliances lies on a common axis and are integrally coupled to corresponding and individual ones of said second pair of appliances and in which the integrally coupled linear rod attachment portions of said pairs of appliances are disposed on opposite sides of the central axis of said float means.

5. The flotation device of claim 1 in which said float means comprises a hollow body.

6. The flotation device of claim 1 in which said float means is comprised of polyurethane foam with said linear rods embedded therein.

7. The flotation device of claim 5 in which said hollow body is comprised of a pair of half-sections integrally joined at their mating edges.

8. The flotation device of claim 7 in which said hollow body is filled with polyurethane foam-like material.

9. The flotation device of claim 3 in which said helical rod means is of a sufficiently large internal diameter so as to only loosely embrace said linear body.

10. An appliance for a linear body comprising:
    supported means having a predetermined central axis and comprising a relatively large, lightweight member of a predetermined geometric configuration for application about said linear body with said linear body being disposed generally coincident said central axis;
    attachment means comprising first and second pairs of attachment elements, said pairs being positioned on opposite sides of said supported member and having central apertures for receiving respective rod members and further with individual ones of each pair being disposed on opposite sides of said linear body; and
    helically preformed rod means comprising first and second pairs of helically preformed appliances each having a helical leg portion for encircling said linear body with the central axes of said helical leg portions each being co-axial with the central axis of said linear body and each having a non-helical rod portion received in a respective and corresponding one of said central apertures of said first and second pairs of attachment elements for coupling said supported member to said linear body.

11. An appliance for a linear body comprising:
    supported means comprising a member of a predetermined geometric configuration for application about said linear body such that portions of said member lie on opposite sides of the longitudinal axis of said linear body;
    attachment means comprising individual attachment elements positioned on opposite sides of said supported member and secured thereto, said elements on each side of said supported member lying on opposite sides of said linear body; and
    helically preformed rod means comprising first and second pairs of helical appliances positioned on opposite sides of said supported member, the individual appliances of each pair having respective terminal portions secured to respective ones of said individual attachment elements on opposed sides of the longitudinal axis of said linear body and having helical leg portions offset in phase relative to one another for application about said linear body in non-interfering relation to secure said supported member to said linear body.

* * * * *